United States Patent
Christenson

(10) Patent No.: US 7,856,588 B2
(45) Date of Patent: Dec. 21, 2010

(54) DATA ALLOCATION IN MEMORY CHIPS

(75) Inventor: Jeffrey Christenson, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1098 days.

(21) Appl. No.: 11/583,308

(22) Filed: Oct. 19, 2006

(65) Prior Publication Data

US 2008/0109704 A1 May 8, 2008

(51) Int. Cl.
*G11C 29/00* (2006.01)
(52) U.S. Cl. .................... 714/766; 714/768
(58) Field of Classification Search ............. 714/766, 714/768
See application file for complete search history.

(56) References Cited

U.S. PATENT DOCUMENTS

| | | | |
|---|---|---|---|
| 5,111,444 A * | 5/1992 | Fukushima et al. | 369/53.17 |
| 5,490,250 A | 2/1996 | Reschke et al. | |
| 5,784,391 A | 7/1998 | Konigsburg | |
| 6,041,001 A | 3/2000 | Estakhri | |
| 7,106,636 B2 | 9/2006 | Eilert et al. | |
| 2002/0078417 A1 | 6/2002 | Takahashi | |
| 2004/0236901 A1 | 11/2004 | Briggs | |
| 2006/0087893 A1 * | 4/2006 | Nishihara et al. | 365/189.01 |
| 2008/0005646 A1 * | 1/2008 | Bains | 714/781 |

* cited by examiner

*Primary Examiner*—Guy J Lamarre

(57) ABSTRACT

In one embodiment, a memory device comprises a first partition to divide the memory device into a first segment to hold a first data block and a second segment to hold a second data block, and a codeword in a single internal word of the memory device.

20 Claims, 10 Drawing Sheets

300

| Bus Bit | Data Bit | S7 | s6 | s5 | s4 | s3 | s2 | s1 | s0 |
|---|---|---|---|---|---|---|---|---|---|
| 0 | 0 | 0 | 0 | 1 | 0 | 0 | 1 | 0 | 1 |
| 1 | 1 | 0 | 0 | 0 | 1 | 1 | 0 | 1 | 0 |
| 2 | 2 | 0 | 0 | 1 | 0 | 0 | 1 | 1 | 0 |
| 3 | 3 | 0 | 0 | 0 | 1 | 1 | 0 | 0 | 1 |
| 4 | 4 | 0 | 0 | 1 | 0 | 1 | 0 | 0 | 1 |
| 5 | 5 | 0 | 0 | 0 | 1 | 0 | 1 | 1 | 0 |
| 6 | 6 | 0 | 0 | 1 | 0 | 1 | 0 | 1 | 0 |
| 7 | 7 | 0 | 0 | 0 | 1 | 0 | 1 | 0 | 1 |
| 8 | 8 | 0 | 0 | 1 | 0 | 1 | 1 | 0 | 0 |
| 9 | 9 | 0 | 0 | 0 | 1 | 0 | 0 | 1 | 1 |
| 10 | 10 | 0 | 0 | 1 | 1 | 0 | 0 | 0 | 1 |
| 11 | 11 | 0 | 0 | 0 | 0 | 1 | 1 | 1 | 0 |
| 12 | 12 | 0 | 0 | 1 | 1 | 0 | 0 | 1 | 0 |
| 13 | 13 | 0 | 0 | 0 | 0 | 1 | 1 | 0 | 1 |
| 14 | 14 | 0 | 0 | 1 | 1 | 0 | 1 | 0 | 0 |
| 15 | 15 | 0 | 0 | 0 | 0 | 1 | 0 | 1 | 1 |
| 0 | 16 | 0 | 1 | 0 | 0 | 1 | 0 | 1 | 0 |
| 1 | 17 | 1 | 0 | 1 | 1 | 0 | 1 | 0 | 1 |
| 2 | 18 | 0 | 1 | 0 | 0 | 1 | 1 | 0 | 0 |
| 3 | 19 | 1 | 0 | 1 | 1 | 0 | 0 | 1 | 1 |
| 4 | 20 | 0 | 1 | 0 | 1 | 0 | 0 | 1 | 1 |
| 5 | 21 | 1 | 0 | 1 | 0 | 1 | 1 | 0 | 1 |
| 6 | 22 | 0 | 1 | 0 | 1 | 0 | 1 | 0 | 0 |
| 7 | 23 | 1 | 0 | 1 | 0 | 1 | 0 | 1 | 1 |
| 8 | 24 | 0 | 1 | 0 | 1 | 1 | 0 | 0 | 0 |
| 9 | 25 | 1 | 0 | 1 | 0 | 0 | 1 | 1 | 1 |
| 10 | 26 | 0 | 1 | 1 | 0 | 0 | 0 | 1 | 0 |
| 11 | 27 | 0 | 0 | 0 | 1 | 1 | 1 | 0 | 0 |
| 12 | 28 | 0 | 0 | 1 | 0 | 0 | 1 | 0 | 0 |
| 13 | 29 | 1 | 0 | 0 | 0 | 1 | 1 | 0 | 1 |
| 14 | 30 | 0 | 0 | 1 | 1 | 0 | 1 | 0 | 0 |
| 15 | 31 | 1 | 0 | 0 | 0 | 1 | 0 | 1 | 1 |

Fig. 3

DATA ALLOCATION IN MEMORY CHIPS

TECHNICAL FIELD

This application relates to electronic computing and more particularly to data allocation in memory chips.

BACKGROUND

Electronic devices such as personal computers (PCs), entertainment products, personal digital assistants (PDAs) and the like typically include one or more memory chips such as, e.g., dynamic random access memory (DRAM) chips. Some electronic devices may utilize only a single DRAM chip, e.g., to reduce part count, cost, or the like.

Utilizing a single DRAM memory chip in electronic devices raises certain design considerations. The memory device should accommodate data spaces of varying size, and data that is accessed at different frequencies. DRAM memory such as, e.g., DDR2 DRAM have inherent limitations on memory density and DRAM memory interfaces typically implement data accesses in bursts of 4-8 bytes of data.

Adroit management of these and other design issues is necessary to resolve these and other issues associated with implementing a single DRAM memory chip in electronic devices.

BRIEF DESCRIPTION OF THE DRAWINGS

FIG. 3 is a schematic illustration of an ECC matrix according to an example embodiment of the present invention.

DETAILED DESCRIPTION

Disclosed are systems and methods for data allocation in a memory chip. As is described in the following, at least in some embodiments the subject matter described here may find particular application in device architectures that make use of a single DRAM device, rather than an array of DRAM devices.

A single DRAM device architecture raises multiple design issues. A single DRAM device architecture inherently benefits from efficient allocation of data in a single DRAM chip. Further, a single DRAM device architecture implies a need to implement burst access techniques to access the data in the DRAM. Other issues include implementing error control coding (ECC) in a single DRAM architecture.

Figure 1:
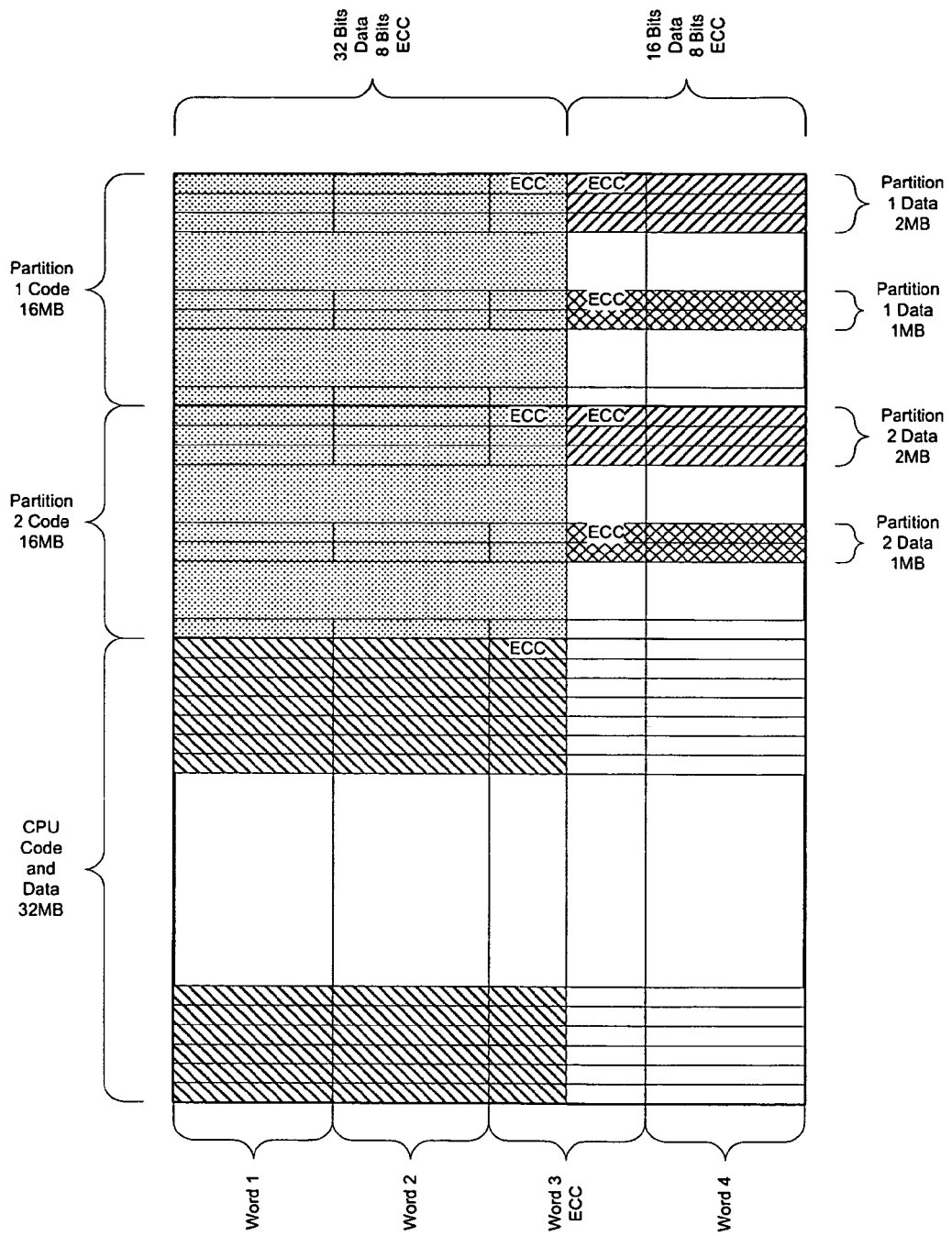
FIG. 1 is a schematic depiction of a memory device according to an example embodiment of the present invention.

FIG. 1 is a schematic depiction of a memory device according to an embodiment. In one embodiment, data may be arranged in a single 128 Mbyte, 16-bit wide DDR2 DRAM device 100. In a DDR2 DRAM device 100 with a 16-bit interface and a burst length of 4, 64 bits are read from the memory array at one time, and they are multiplexed to create the 4 16-bit words at the outputs. Thus, the four words of a burst may be considered a unit of 64 bits.

Referring to FIG. 1, memory device 100 may be divided by one or more virtual partitions. Partitions may divide memory device 100 both horizontally and vertically. In the embodiment depicted in FIG. 1, the memory device 100 is divided horizontally into three separate sections and is divided vertically into two separate sections. Partitioning the memory device 100 permits data to be stored in blocks that need neither be contiguous nor adjacent to one another.

Thus, in the embodiment depicted in FIG. 1, device 100 includes a first 16 MB partition and a second 16 MB partition, which contain code executable by one or more applications executable by an associated controller, and a 32 MB partition that includes code and data for the CPU. Device 100 further includes two 2 MB data blocks that contain data for use with the code in partition 1, and two 1 MB data blocks that contain data for use with the code in partition 2.

In one embodiment, data may be read from memory device 100 in a burst which retrieves a 64-bit line of data from device 100. The 64 bit line of data may be divided into four 16-bit words. The first two words of a burst hold 32 bits of data. The third word holds two 8-bit ECC codewords—one is mated with the 32 bits of data, and the other is mated with the 16 bits of data in the fourth word of the burst. As used herein, the term codeword refers to a data block that comprise an error control code. The data block may comprise both data and one or more check bits. When the device 100 is read for the purpose of fetching code, i.e., the partition 1 code, the partition 2 code, or the CPU code, the remaining 16 bits of data from a given line may be discarded. Similarly, when the device 100 is read for the purpose of fetching data, i.e., the partition 1 data or the partition 2 data, the first 32 bits of code and the 8-bit ECC associated with the code may be discarded.

In one embodiment, writes to the data may be performed as a read-modify-write (RMW) access so that the new data can be merged into the burst with the existing code. In the area that holds embedded CPU memory, the rate of writes will be much higher, so the extra space may be unused to avoid a performance penalty of a RMW cycle.

A "read-only" instruction code may be written to the DRAM by a controller while the partition is held in reset or is powered-off. At that time, the data areas can also be initialized to effect a write of the whole burst of data. While the partition is operating, writes to the code space may be prohibited.

Error Control Coding (ECC)

In one embodiment, an electronic device may implement error control coding when writing data to or reading data from device 100. One byte of ECC may be paired with each portion of data, which allows a standard 32-bit single-error-correct, double-error-detect (SEC-DED) code to be used independently of another standard code for the 16-bit word. ECC may be implemented by using an ECC-matrix and an XOR circuit tree to apply XOR functions to data written into memory device 100 and data read from memory device 100 to generate a product referred to as a syndrome.

Figure 2A:
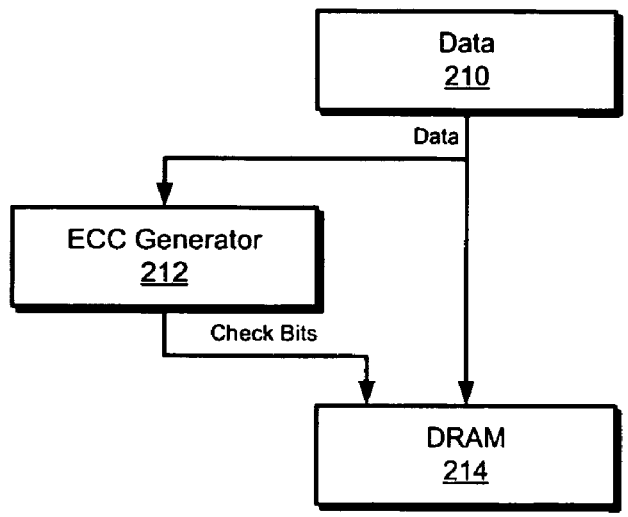
FIG. 2A is a schematic illustration of data flows in write operations to a memory device according to an example embodiment of the present invention.

FIG. 2A is a schematic illustration of data flows in write operations to a memory device. Referring to FIG. 2A, data 210 from a data source such as, e.g., user data may be written to DRAM 214. Data 210 is also routed to ECC generator 212, which performs ECC on the data to generate check bits, which are directed to DRAM 214.

Figure 2B:
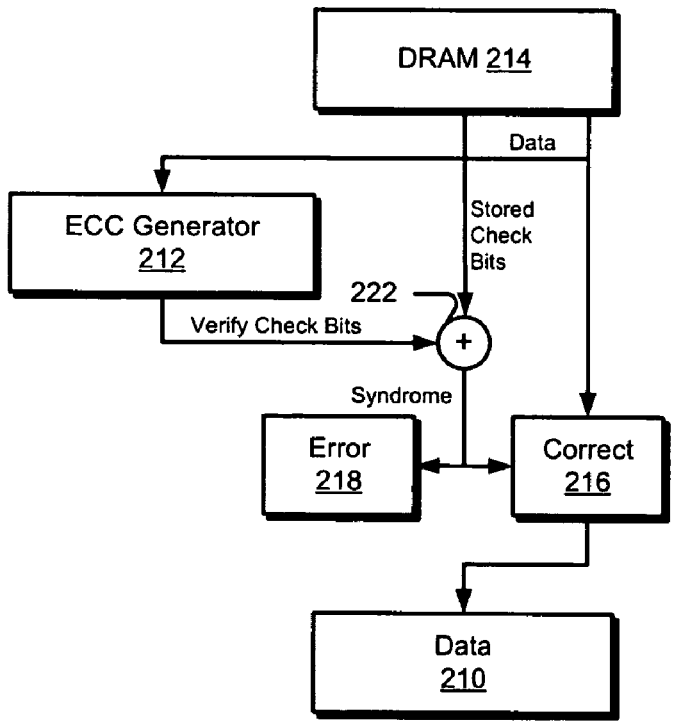
FIG. 2B is a schematic illustration of data flows in read operations to a memory device according to an example embodiment of the present invention.

FIG. 2B is a schematic illustration of data flows in read operations from a memory device. Referring to FIG. 2B, data from DRAM 214 is directed to ECC generator 212, which generates verify check bits. Stored check bits from DRAM 214 are directed to comparator 222, which compares the verify check bits with the stored check bits to generate a syndrome. In the event that a double-bit error occurs, an error module 218 may be invoked. The error module may invoke a new read operation or may generate a signal indicating that the read operation has failed, or both. By contrast, in the event that a single-bit error occurs, the data and the syndrome may be input to a correction module 216. The correction module may implement error correction techniques to correct the single-bit error. The data 210 is then output to a destination such as, e.g., user data.

Figure 4:
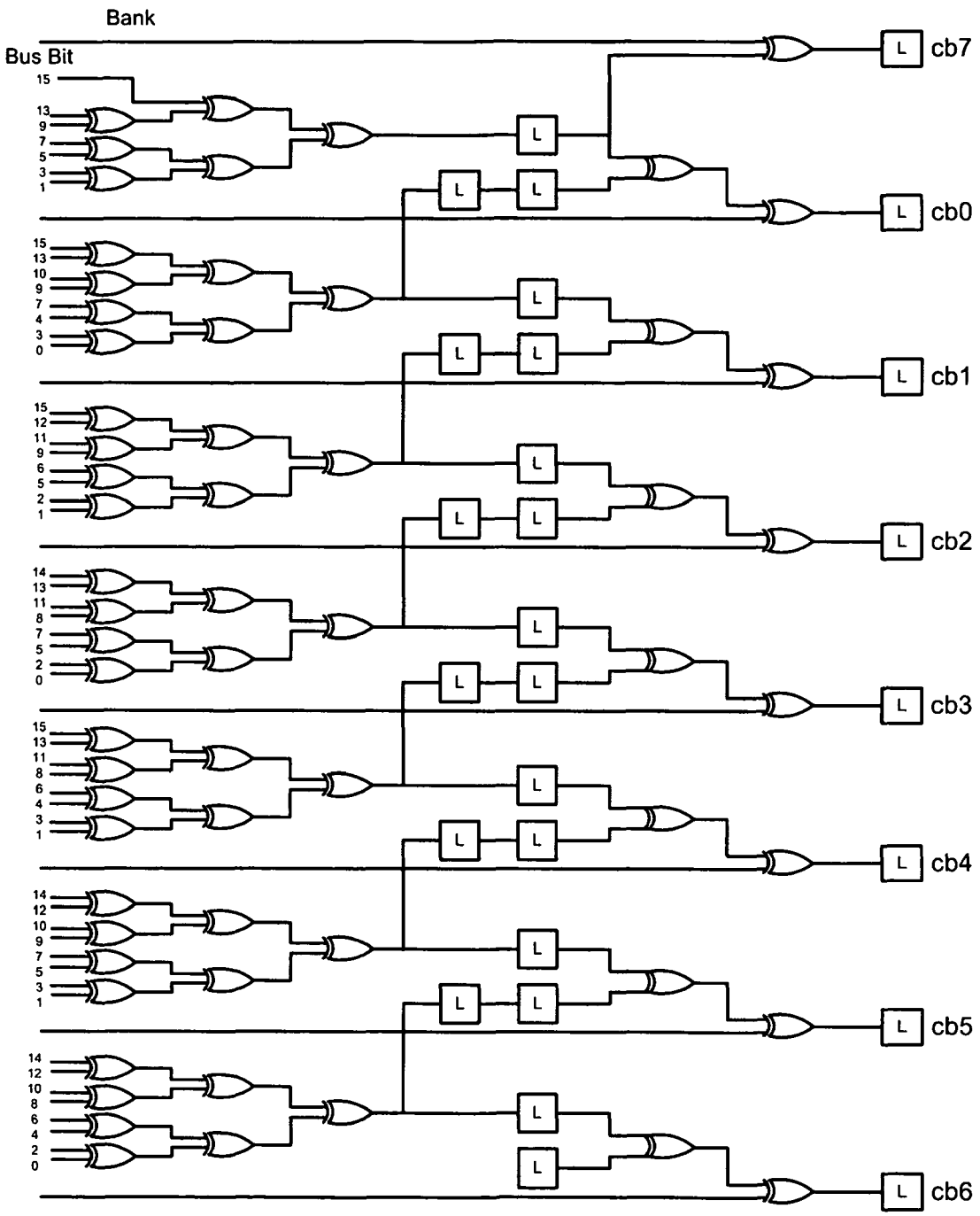
FIG. 4 is a schematic illustration of an error checking circuit according to an example embodiment of the present invention.

FIG. 3 is a schematic illustration of an ECC matrix according to an embodiment, and FIG. 4 is a schematic illustration of an ECC XOR circuit that implements the ECC matrix of the embodiment in FIG. 3. The XOR circuit 400 depicted in FIG. 4 may correspond to the ECC generator 212. Referring to the ECC matrix 300 of FIG. 3, the shaded section of data bits 0-15 is the same pattern as the shaded section through data bits 16-31, but shifted by one position. The S0 and S7 bits in data bits 16-31 are selected to make all of the entries in the ECC matrix unique.

Thus, the connections of data bits from the ECC matrix to XOR trees are identical for the two sections of bits coming from the ECC matrix. In operation, a 16-bit data wide bus takes two clock cycles to deliver the data from a line of the memory device 100. Thus, the ECC logic can use the same XOR connections but simply shift where the results are used. On the third clock cycle, the stored check bits arrive, and the XORing of the three cycles results in a final syndrome.

Referring briefly to FIG. 4, the XOR tree 400 receives inputs from either the data 210 or the DRAM 214 via a data bus. Data read from a DRAM device such as device 214 typically arrives at an input/output interface over multiple clock cycles. Thus, ECC may be implemented in a pipelined manner, so that the XOR tree 400 does not need to be traversed by all of the bits in a single clock cycle. Result from XOR operations implemented by the XOR tree are stored in latches, indicated by boxes with an "L" in FIG. 4. This requires less logic and allows a higher clock rate to be used. In one embodiment, the same XOR logic can be used for each of the three 16-bit words read from any line of the memory device 100. Between the first and second data words, XOR results are accumulated into different sets of check bits.

Figure 5:
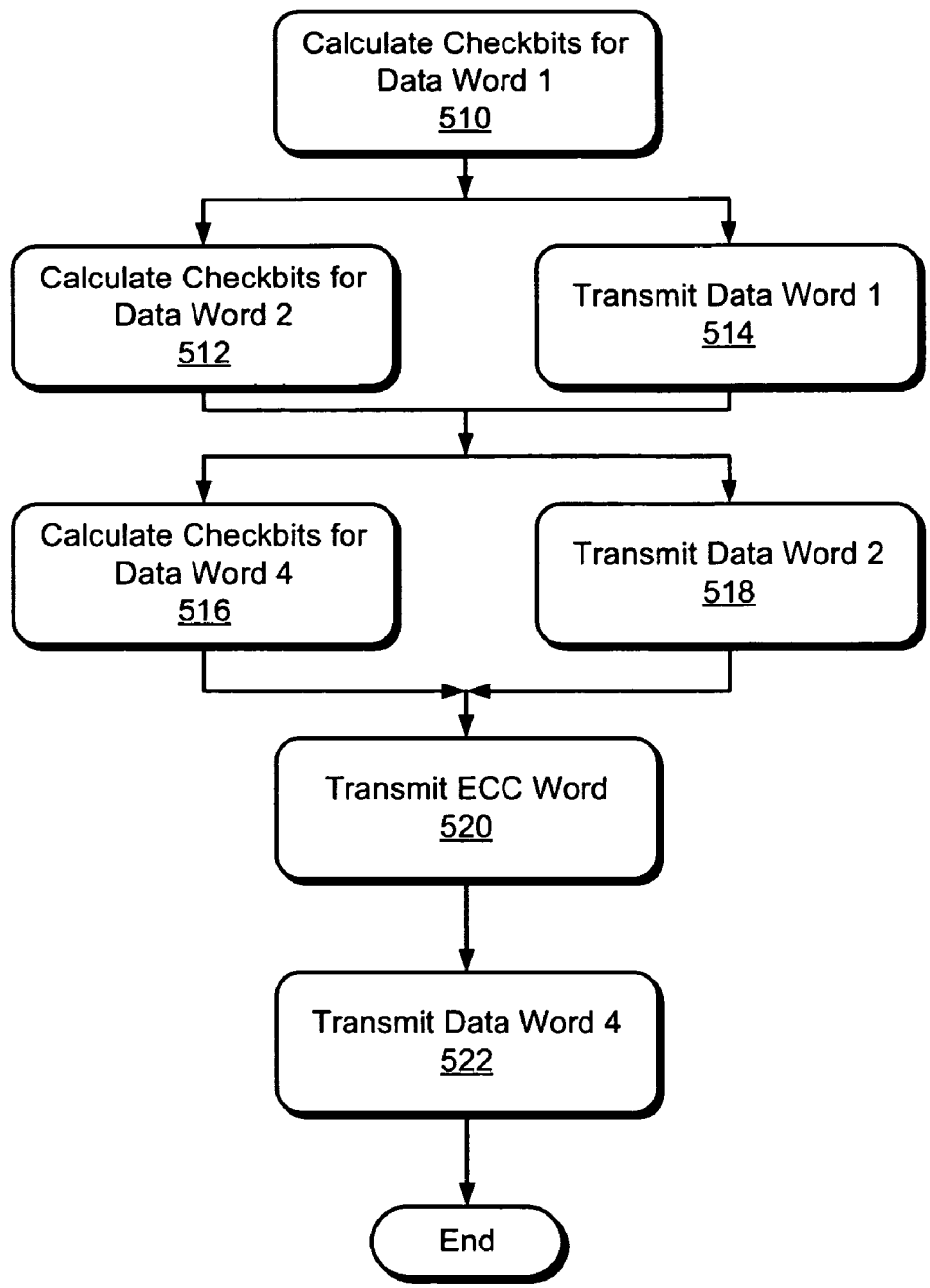
FIG. 5 is a flowchart illustrating ECC operations in a method for writing to a memory device according to an example embodiment of the present invention.

FIG. 5 is a flowchart illustrating ECC operations in a method for writing to a memory device such as memory device 100 according to an embodiment. As described above, a write operation to memory device 100 may be executed in data words, one or more of which may be combined to form a burst. Data words may be written to memory device 100 and processed by XOR tree 400 in successive clock cycles. Thus, the operations depicted in FIG. 5 may be executed over successive clock cycles.

At operation 510 the XOR tree 400 receives the first data word and calculates checkbits for the first data word being written to the memory device 100. Operations 512 and 514 may be executed during the same clock cycle. At operation 512 the XOR tree 400 receives the second data word and calculates checkbits for the second data word being written to the memory device 100. Contemporaneously, at operation 514 the first data word is transmitted to memory device 100.

Operations 516 and 518 may be executed during the same clock cycle. At operation 516 the XOR tree 400 receives the fourth data word and calculates checkbits for the fourth data word being written to the memory device 100. Contemporaneously, at operation 518 the second data word is transmitted to memory device 100.

At operation 520 the ECC word calculated by the XOR tree 400 is transmitted to the memory device 100, and at operation 522 the fourth data word is transmitted to the memory device 100.

Figure 6:
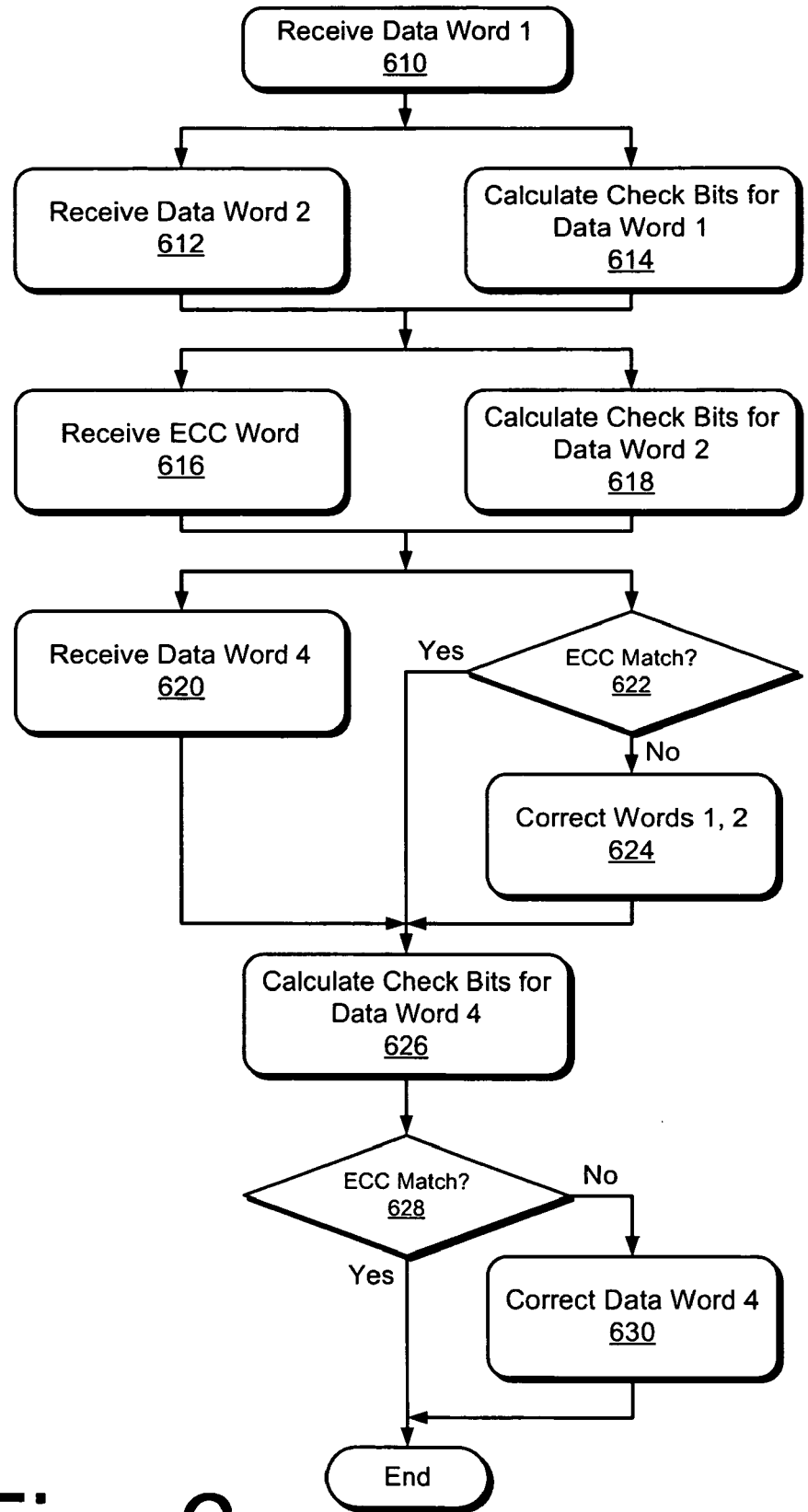
FIG. 6 is a flowchart illustrating ECC operations in a method for reading from a memory device according to an example embodiment of the present invention.

FIG. 6 is a flowchart illustrating ECC operations in a method for reading from a memory device such as memory device 100 according to an embodiment. As described above, a read operation to memory device 100 may be executed in data words, one or more of which may be combined to form a burst. Data words may be read from memory device 100 and processed by XOR tree 400 in successive clock cycles. Thus, the operations depicted in FIG. 6 may be executed over successive clock cycles.

At operation 610 the first data word is received from the memory device 100. At operation 612 the second data word is received from the memory device 100. Contemporaneously, at operation 614 the XOR tree 400 calculates verify check bits for the first data word being read from the memory device 100. Operations 612 and 614 may be executed during the same clock cycle.

At operation 616 the ECC word is received from memory device 100. Contemporaneously, at operation 618 the XOR tree 400 calculates verify check bits for the second data word read from memory device 100. Operations 616 and 618 may be executed during the same clock cycle.

At operation 620 the fourth data word is received from memory device 100. Contemporaneously, if at operation 622 the ECC calculated by the XOR tree 400 for data words 1 and 2 does not match the ECC read from memory table 100 then control passes to operation 624 and data words 1 and 2 are corrected.

By contrast, if at operation 622 the ECC matches, then control passes to operation 626 and verify check bits are calculated for data word 4. If at operation 628 the ECC calculated by the XOR tree 400 for data word 4 does not match the ECC read from memory device 100, then control passes to operation 630 and data word 4 is corrected. By contrast, if the ECC matches, then the read operation may end.

Figure 7:
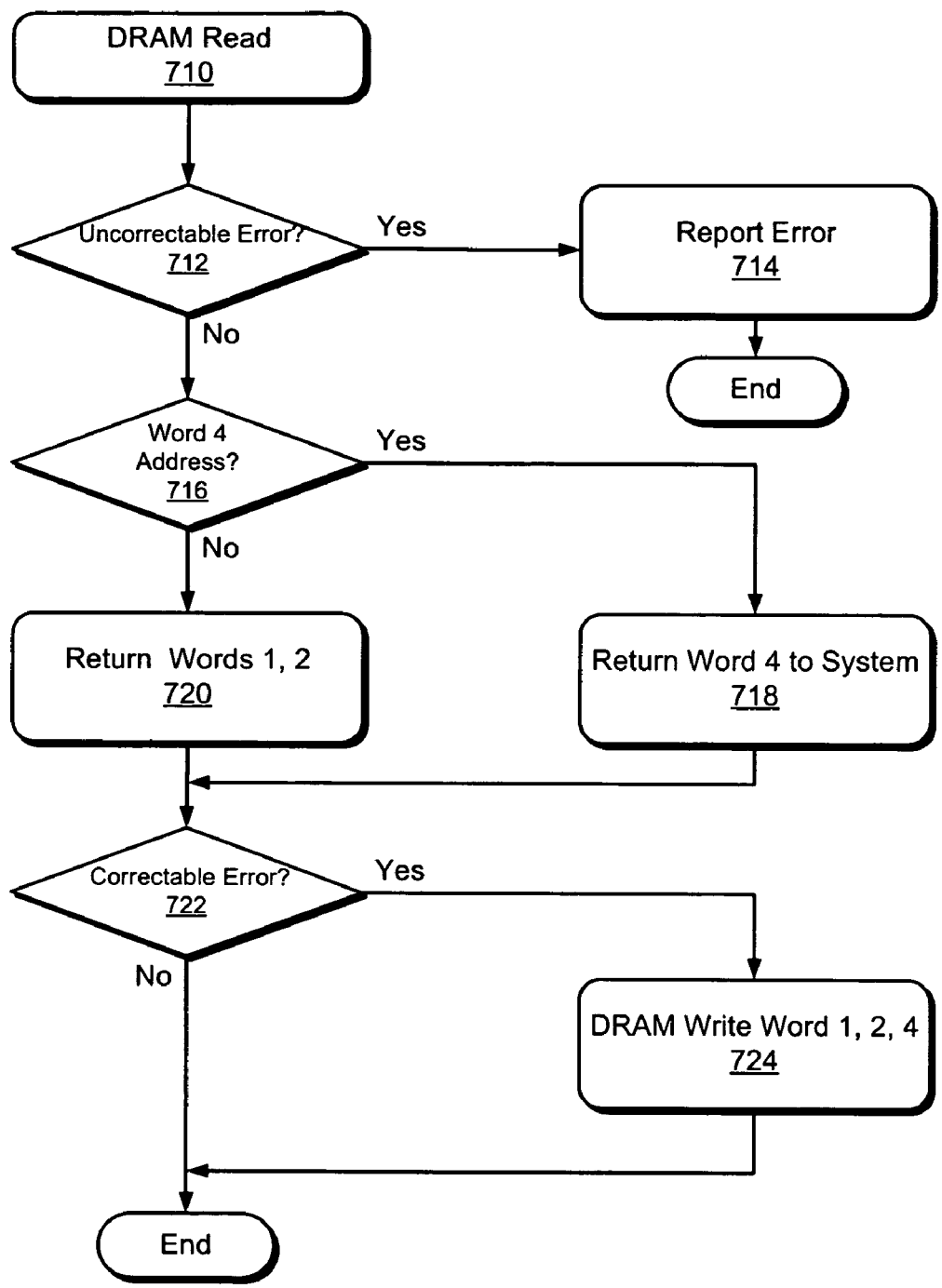
FIG. 7 is a flowchart illustrating operations in a method for reading from a memory device according to an example embodiment of the present invention.

FIG. 7 is a flowchart illustrating operations in a method for reading from a memory device such as memory device 100 according to an embodiment. The operations of FIG. 7 may be implemented at a system level. At operation 710 a DRAM read operation such as, e.g., the read operation described in detail with reference to FIG. 6, is implemented on an address in memory device 100. In practice, the address may be received in a read request directed to a memory interface such as, e.g., in input/output (I/O) controller.

If, at operation 712 an uncorrectable error was detected in the DRAM read operation, then control passes to operation 714 and the error is reported. For example, an uncorrectable error may include a double-bit error resulting from the DRAM read operation 710. Reporting the error may include generating a warning on a user interface such as, e.g., a display on an electronic device or the like.

By contrast, if at operation 712 an uncorrectable error did not occur, then control passes to operation 716 and it is determined whether the memory address corresponds to a word 4 memory location in memory device 100. By way of example, referring to FIG. 1, a read request may be directed to one of the data fields in the word 4 column of memory device. If the memory location corresponds to a word 4 memory location, then control passes to operation 718 and the fourth word is returned to the system component that invoked the read operation.

By contrast, if at operation 716 the memory address does not correspond to a word 4 memory location, then control passes to operation 720 and words 1 and 2 from the specified address in memory device 100 are returned to the system component that invoked the read operation.

If, at operation 722 a correctable error was detected in the data returned from the read operation, then control passes to operation 724 and a DRAM write operation is invoked to write words 1, 2, and 4 to the address specified in the read operation. Operation 724 effectively overwrites the data in the memory address, thereby invoking the ECC generator to correct any errors in the data.

Figure 8:
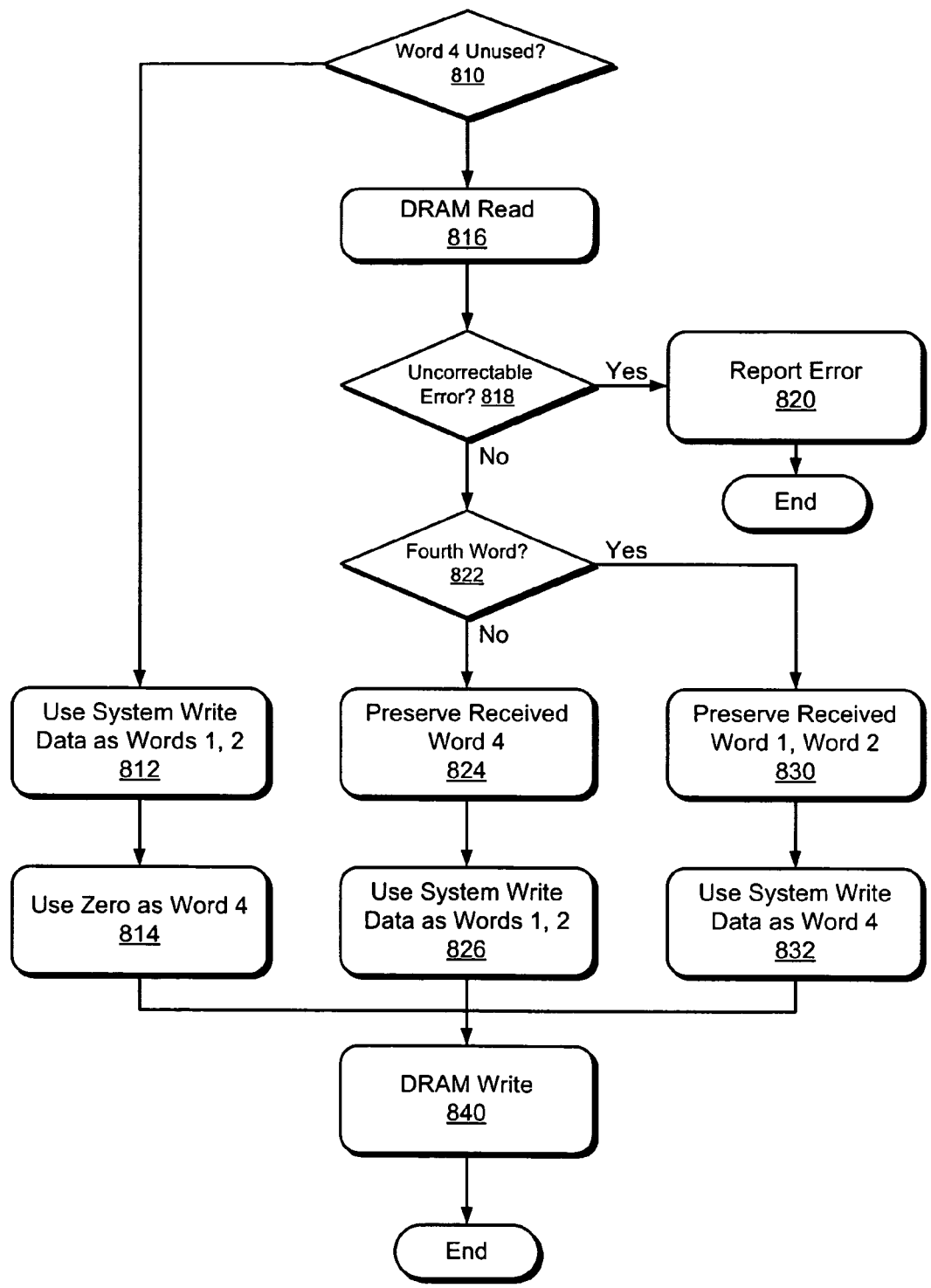
FIG. 8 is a flowchart illustrating operations in a method for writing to a memory device according to an example embodiment of the present invention.

FIG. 8 is a flowchart illustrating operations in a method for writing to a memory device such as memory device 100 according to an embodiment. The operations of FIG. 8 may be implemented at a system level. In practice, a write request identifying an address in memory device 100 may be received in an input/output (I/O) controller coupled to memory device 100.

If, at operation 810, the word 4 portion of the memory address is unused (i.e. empty), then control passes to operation 812 and the data received with the write request is used as words 1 and 2 in the memory device. At operation 814 word 4 may be written with all zeros. Control then passes to operation 840 and a DRAM write operation such as, e.g., the DRAM write operation described in detail with reference to FIG. 5 is implemented on the address in memory device 100.

By contrast, if at operation 810 word 4 of the memory address identified in the write request is used, then control passes to operation 816 and a DRAM read operation such as, e.g., the read operation described in detail with reference to FIG. 6, is implemented on an address in memory device 100. If, at operation 818 an uncorrectable error was detected in the DRAM read operation, then control passes to operation 820 and the error is reported. For example, an uncorrectable error may include a double-bit error resulting from the DRAM read operation 816. Reporting the error may include generating a warning on a user interface such as, e.g., a display on an electronic device or the like.

By contrast, if at operation 818 an uncorrectable error did not occur, then control passes to operation 822 and it is determined whether the memory address corresponds to a word 4 memory location in memory device 100. By way of example, referring to FIG. 1, a read request may be directed to one of the data fields in the word 4 column of memory device. If the memory location corresponds to a word 4 memory location, then control passes to operation 830 and the data retrieved from word 1 and word 2 in the DRAM read operation are preserved. Control then passes to operation 832 and the data received with the write request is used as word 4 in the memory device 100. Control then passes to operation 840 and a DRAM write operation such as, e.g., the DRAM write operation described in detail with reference to FIG. 5 is implemented on the address in memory device 100.

By contrast, if at operation 822 the memory address does not correspond to a word 4 memory location, then control passes to operation 824 and the data retrieved from word 4 in the DRAM read operation is preserved. Control then passes to operation 826 and the data received with the write request is used as words 1 and 2 in the memory device 100. Control then passes to operation 840 and a DRAM write operation such as, e.g., the DRAM write operation described in detail with reference to FIG. 5 is implemented on the address in memory device 100.

The operations described with reference to FIGS. 5-8 pertain to an embodiment in which ECC is performed only on the data retrieved from the memory device 100. In alternate embodiments of ECC, the expected address may be used with the data to create a longer word for ECC coverage. For example, 32 bits of data may be combined with up to 32 bits of address to create a 64-bit word that can be covered by 8 bits of ECC. Applying ECC to both the address and the data ensures not only that valid data was read from the DRAM, but also that it came from the correct address. A single-bit error in the address bits may be used to signal a hard error or force a retry of the read. Some DIMM implementations of DDR may have parity protection in a logic device on the DIMM.

Figure 9A:
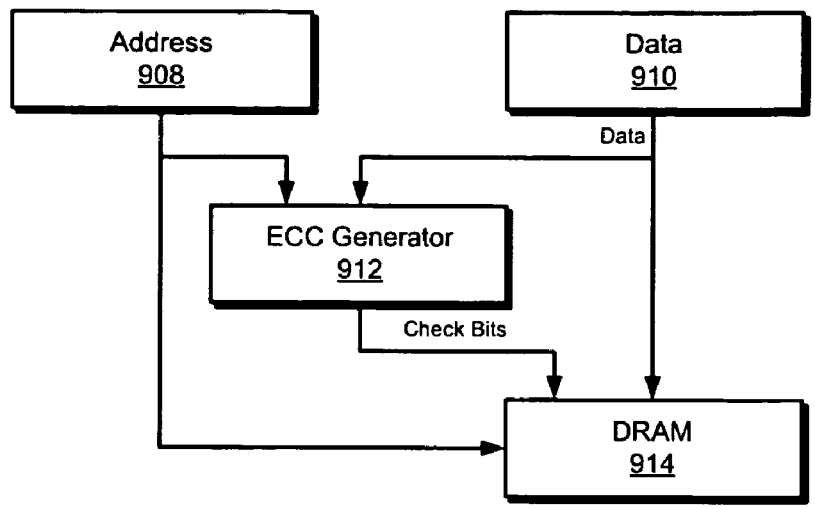
FIG. 9A is a schematic illustration of data flows in write operations to a memory device in an embodiment that performs ECC on both address and data according to an example embodiment of the present invention.

FIG. 9A is a schematic illustration of data flows in write operations to a memory device in an embodiment that performs ECC on both address and data. Referring to FIG. 9A, address information 908 and data 910 from a data source such as, e.g., user data may be used to write data 910 to address 908 within DRAM 914. Data 910 and address 908 are also routed to ECC generator 912, which performs ECC on the address and the data to generate check bits, which are directed to DRAM 914.

Figure 9B:
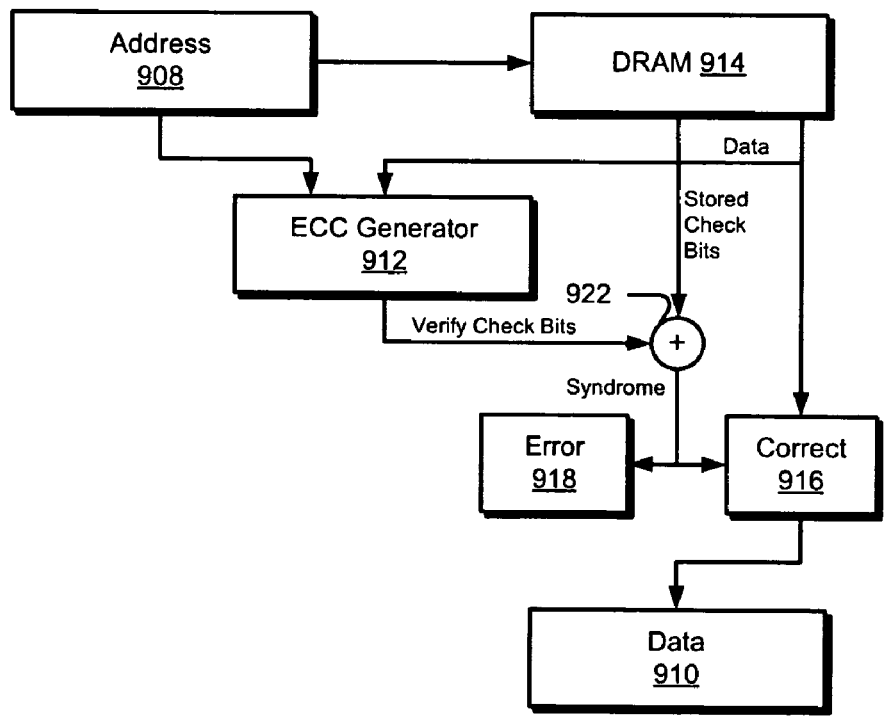
FIG. 9B is a schematic illustration of data flows in read operations to a memory device in an embodiment that performs ECC on both address and data according to an example embodiment of the present invention.

FIG. 9B is a schematic illustration of data flows in read operations from a memory device in an embodiment that performs ECC on both address and data. Referring to FIG. 9B, data from DRAM 914 and address information 908 is directed to ECC generator 212, which generates verify check bits. Stored check bits from DRAM 914 are directed to comparator 922, which compares the verify check bits with the stored check bits to generate a syndrome. In the event that a double-bit error occurs, or any error in the address bits, an error module 918 may be invoked. The error module may invoke a new read operation or may generate a signal indicating that the read operation has failed, or both. By contrast, in the event that a single-bit error occurs in the data bits, the data and the syndrome may be input to a correction module 916. The correction module may implement error correction techniques to correct the single-bit error. The data 910 is then output to a destination such as, e.g., user data.

Figure 10:
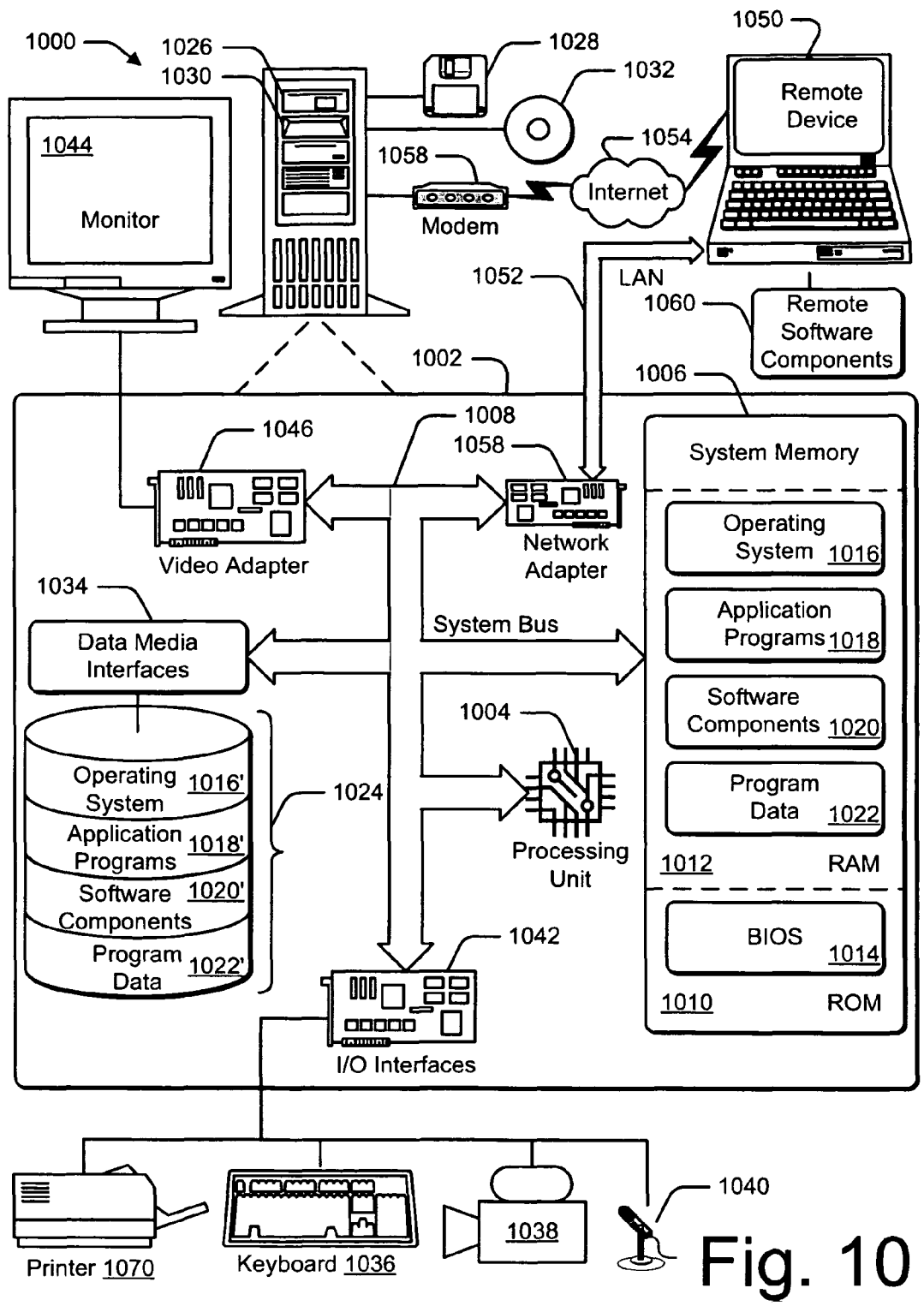
FIG. 10 is a schematic illustration of a computing system according to an embodiment according to an example embodiment of the present invention.

In some embodiments the memory device 100 may be implemented in an electronic device such as, e.g., a computer. FIG. 10 shows components of typical example of such a computer, referred by to reference numeral 1000. The components shown in FIG. 10 are only examples, and are not intended to suggest any limitation as to the scope of the functionality of the invention; the invention is not necessarily dependent on the features shown in FIG. 10.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 10, the components of computer 1000 may include, but are not limited to, a processing unit 1004, a system memory 1006, and a system bus 1008 that couples various system components including the system memory 1006 to the processing unit 1004. The system bus 1008 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 1000 typically includes a variety of computer-readable media. Computer-readable media can be any available media that can be accessed by computer 1000 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1000. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 1006 includes computer storage media in the form of volatile and/or nonvolatile memory such as read only memory (ROM) 1010 and random access memory (RAM) 1012. A basic input/output system 1014 (BIOS), containing the basic routines that help to transfer information between elements within computer 1000, such as during start-up, is typically stored in ROM 1010. RAM 1012 typically contains data and/or program modules that are immediately accessible to and/or presently being operated on by processing unit 1004. By way of example, and not limitation, FIG. 10 illustrates operating system 1016, application programs 1018, other software components 1020, and program data 1022.

The computer 1000 may also include other removable/non-removable, volatile/nonvolatile computer storage media. By way of example only, the computer system of FIG. 10 may include a hard disk drive 1024 that reads from or writes to non-removable, nonvolatile magnetic media, a magnetic disk drive 1026 that reads from or writes to a removable, nonvolatile magnetic disk 1028, and an optical disk drive 1030 that reads from or writes to a removable, nonvolatile optical disk 1032 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1024 is typically connected to the system bus 1008 through a non-removable memory interface such as data media interface 1034, and magnetic disk drive 1026 and optical disk drive 1030 are typically connected to the system bus 1008 by a removable memory interface.

The drives and their associated computer storage media discussed above and illustrated in FIG. 10 provide storage of computer-readable instructions, data structures, program modules, and other data for computer 1000. In FIG. 10, for example, hard disk drive 1024 is illustrated as storing operating system 1016', application programs 1018', software components 1020', and program data 1022'. Note that these components can either be the same as or different from operating system 1016, application programs 1018, software components 1020, and program data 1022. Operating system 1016, application programs 1018, other program modules 1020, and program data 1022 are given different numbers here to illustrate that, at a minimum, they are different copies. A user may enter commands and information into the computer 1000 through input devices such as a keyboard 1036 and pointing device 1038, commonly referred to as a mouse, trackball, or touch pad. Other input devices (not shown) may include a microphone 1040, joystick, game pad, satellite dish, scanner, or the like. These and other input devices are often connected to the processing unit 1004 through an input/output (I/O) interface 1042 that is coupled to the system bus, but may be connected by other interface and bus structures, such as a parallel port, game port, or a universal serial bus (USB). A monitor 1044 or other type of display device is also connected to the system bus 1006 via an interface, such as a video adapter 1046. In addition to the monitor 1044, computers may also include other peripheral output devices (e.g., speakers) and one or more printers 1070, which may be connected through the I/O interface 1042.

The computer may operate in a networked environment using logical connections to one or more remote computers, such as a remote computing device 1050. The remote computing device 1050 may be a personal computer, a server, a router, a network PC, a peer device or other common network node, and typically includes many or all of the elements described above relative to computer 1000. The logical connections depicted in FIG. 10 include a local area network (LAN) 1052 and a wide area network (WAN) 1054. Although the WAN 1054 shown in FIG. 10 is the Internet, the WAN 1054 may also include other networks. Such networking environments are commonplace in offices, enterprise-wide computer networks, intranets, and the like.

When used in a LAN networking environment, the computer 1000 is connected to the LAN 1052 through a network interface or adapter 1056. When used in a WAN networking environment, the computer 1000 typically includes a modem 1058 or other means for establishing communications over the Internet 1054. The modem 1058, which may be internal or external, may be connected to the system bus 1008 via the I/O interface 1042, or other appropriate mechanism. In a networked environment, program modules depicted relative to the computer 1000, or portions thereof, may be stored in the remote computing device 1050. By way of example, and not limitation, FIG. 10 illustrates remote application programs 560 as residing on remote computing device 1050. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A method, comprising:
    implementing a partition in a memory device;
    storing a first data block in a first portion of the memory device; and
    storing a codeword comprising Error Control Coding (ECC) bits in a single internal word of any line of the memory device, said ECC bits corresponding to data from that line of the memory device.

2. The method of claim 1, wherein codeword comprises:
    a first segment of data; and
    a second segment comprising an error correction code.

3. The method of claim 2, wherein second segment of the codeword comprises:
    one or more data bits that may be used in performing error checking on the data stored in the memory device; and
    one or more data bits that may be used in performing error checking on the address associated with the data stored in the memory device.

4. The method of claim 3, wherein performing error checking comprises:
    applying a segment of the codeword to an error correction circuit to calculate one or more check bits for the segment of the codeword; and
    comparing those check bits with the check bits stored in the remaining segment of the codeword.

5. The method of claim 4, further comprising initiating an error correction routine when check bits for a codeword indicate an error in the data block.

6. The method of claim 1, further comprising storing multiple codewords in the memory device, wherein each codeword is stored in a single internal word of the memory device.

7. A memory device, comprising:
    a first partition to divide the memory device into a first segment to hold a first data block and a second segment to hold a second data block; and
    a codeword comprising Error Control Coding (ECC) bits in a single internal word of any line of the memory device, said ECC bits corresponding to data from that line of the memory device.

8. The memory device of claim 7, wherein a first portion of the codeword is stored in the first segment and a second portion of the codeword is stored in the second segment.

9. The memory device of claim 7, further comprising a second partition to divide the memory device into a third segment and a fourth segment.

10. The memory device of claim 7, further comprising an input/output interface that reads data from the memory device in bursts, wherein each burst comprises a data word.

11. The memory device of claim 10, further comprising an error correction code circuit coupled to the input/output interface, wherein the error correction code circuit calculates a series of check bits for a data word read from the memory device.

12. The memory device of claim 10, wherein codeword comprises:
    a first segment of read/write data; and
    a second segment comprising an error correction code.

13. The memory device of claim 10, further comprising multiple codewords stored in the memory device, wherein each codeword is stored in a single internal word of the memory device.

14. The memory device of claim 13, wherein second segment of the codeword comprises:

one or more data bits that may be used in performing error checking on the data stored in the memory device; and one or more data bits that may be used in performing error checking on the address associated with the data stored in the memory device.

15. A memory device, wherein the memory device comprises:

a number of rows of memory elements, each row divided into a number of words;

a first partition comprising a first portion of each row and a second partition comprising a second portion of each row; and a codeword comprising error control coding (ECC) bits, said codeword being contained in one of said words, said word comprising said codeword having a first portion in said first partition and a second portion in said second partition of the memory device.

16. The memory device of claim 15, wherein:

said first portion of said codeword in said first partition of said memory device comprises ECC bits for other words in its row within said first partition of said memory device; and said second portion of said codeword in said second partition of said memory device comprises ECC bits for other words in its row within said second partition of said memory device.

17. The memory device of claim 15, wherein a read burst from said memory device comprises all the words of a said row.

18. The memory device of claim 15, wherein said first partition comprises code for execution by a processor and said second partition comprises other data stored by a processor while executing said code.

19. The memory device of claim 18, wherein said first partition comprises a first sub-partition comprising Central Processing Unit (CPU) code and a second sub-partition comprising other code.

20. The memory device of claim 19, wherein a segment of said second partition corresponding by row to said first sub-partition comprising said CPU code is left unused to avoid a performance penalty of a Read-Modify-Write (RMW) cycle.

* * * * *